United States Patent
Shirai et al.

(10) Patent No.: US 8,302,498 B2
(45) Date of Patent: Nov. 6, 2012

(54) SEALED LINEAR ACTUATOR UNIT

(75) Inventors: Takeki Shirai, Tokyo (JP); Katsuya Iida, Tokyo (JP); Soshi Miyahara, Tokyo (JP); Ryuji Furusawa, Tokyo (JP)

(73) Assignee: THK Co., Ltd., Tokyo (JP)

( * ) Notice: Subject to any disclaimer, the term of this patent is extended or adjusted under 35 U.S.C. 154(b) by 353 days.

(21) Appl. No.: 12/674,024

(22) PCT Filed: Sep. 10, 2008

(86) PCT No.: PCT/JP2008/066287
§ 371 (c)(1),
(2), (4) Date: Feb. 18, 2010

(87) PCT Pub. No.: WO2009/034981
PCT Pub. Date: Mar. 19, 2009

(65) Prior Publication Data
US 2011/0126648 A1 Jun. 2, 2011

(30) Foreign Application Priority Data
Sep. 14, 2007 (JP) ................. 2007-238939

(51) Int. Cl.
F16H 3/06 (2006.01)
F16H 27/02 (2006.01)
F16H 29/02 (2006.01)
F16H 29/20 (2006.01)

(52) U.S. Cl. ........................ 74/89.4; 74/89.22

(58) Field of Classification Search .............. 74/89.4, 74/49.44, 89.2, 89.22
See application file for complete search history.

(56) References Cited

U.S. PATENT DOCUMENTS

| 4,485,690 A | * | 12/1984 | Lipinski et al. | 74/609 |
| 5,380,246 A | * | 1/1995 | Katahira | 454/64 |
| 5,590,580 A | * | 1/1997 | Nagai | 92/33 |
| 7,066,649 B2 | * | 6/2006 | Nagai et al. | 384/15 |
| 2007/0234832 A1 | * | 10/2007 | Iida | 74/89.22 |

FOREIGN PATENT DOCUMENTS

| JP | 63-172545 U | 11/1988 |
| JP | 3-33041 U | 4/1991 |
| JP | 11-223259 A | 8/1999 |

OTHER PUBLICATIONS

International Search Report of PCT/JP2008/066287, mailing date of Dec. 16, 2008.

* cited by examiner

Primary Examiner — Justin Krause
(74) Attorney, Agent, or Firm — Westerman, Hattori, Daniels & Adrian, LLP

(57) ABSTRACT

A linear actuator unit has a slide plate which is allowed to freely move along the outer rail while causing a cover to retreat. The linear actuator unit includes: an outer rail, which is formed into a cylindrical shape, and includes the slit-opening portion formed along an axial direction thereof; the slide plate (3), which is coupled to an inner block in the hollow portion through the slit-opening portion; a cover belt, which is tensioned between both ends in a longitudinal direction of the outer rail so as to cover the slit-opening portion; a belt-guiding member, which separates the cover belt from the outer rail correspondingly to movement of the slide plate; and a seal member, which seals between the belt-guiding member and the cover belt and between the belt-guiding member and the outer rail.

4 Claims, 5 Drawing Sheets

SEALED LINEAR ACTUATOR UNIT

TECHNICAL FIELD

The present invention relates to a linear actuator unit, which includes a driving means in a hollow portion of an outer rail, and allows a slide plate, which is arranged outside the outer rail, to advance and retreat by an arbitrary amount by such driving means. In particular, the present invention relates to a sealed linear actuator unit of a type, in which a slit-opening portion, which is formed in the outer rail, is covered with a cover belt.

BACKGROUND ART

Conventionally, as the sealed linear actuator unit of this type, there is known a linear actuator unit disclosed in JP63-172545 U. The linear actuator unit includes an outer rail, an inner block, and a slide plate. The outer rail is formed into a cylindrical shape so as to include a hollow portion, and includes a slit-opening portion formed along an axial direction thereof. The inner block travels in the hollow portion along a track rail arranged in the outer rail. The slide plate is arranged outside the hollow portion of the outer rail, and is coupled to the inner block through the slit-opening portion. By fixing an object to be conveyed to the slide plate, it is possible to cause such objet to be conveyed to freely move along the outer rail.

Further, in the hollow portion of the outer rail, there is arranged a screw shaft, and the inner block is screwed into the screw shaft. Thus, by rotating the screw shaft by a motor arranged at one end of the outer rail, it is possible to provide the inner block with a moving direction and a moving distance corresponding to a rotational direction and a rotational amount of the screw shaft. Further, it is possible to provide an arbitrary linear reciprocating movement to the slide plate installing thereon the objet to be conveyed.

In addition, in the conventional linear actuator unit, in order to prevent dust from getting into the outer rail through the slit-opening portion, there is provided a belt-like cover covering such slit-opening portion. The cover is tensioned between both ends of the outer rail. Both edge portions along a longitudinal direction of the cover is held in contact with a pair of flange portions of the outer rail, the flange portions being opposed to each other while sandwiching the slit-opening portion. In this way, the cover closes the slit-opening portion.

In order to allow the reciprocating movement of the slide plate in a state in which the slit-opening portion is covered with the cover, roller groups for lifting up the cover from the outer rail are provided on a front side and a rear side of the slide plate, respectively. When the slide plate approaches the cover, the cover is separated from the outer rail by a roller group positioned on the front side of such slide plate. After the cover passes through the slide plate, the cover is, in turn, pressed against the outer rail by a roller group positioned on the rear side of such slide plate.
Patent Document 1: JP 63-172545 U

DISCLOSURE OF THE INVENTION

Problems to be Solved by the Invention

However, in the conventional linear actuator unit as described above, the slide plate moves while separating the cover from the outer rail, and hence a large gap is formed between the cover and the outer rail on the front side and the rear side of the slide plate. As a result, there is a fear in that the dust gets into the outer rail through such gap.

Further, dust adhering onto a surface of the cover passes, when the slide plate approaches the dust, through the roller groups and then reaches the slide plate without being never removed. Thus, when a gap is formed between the cover and the outer rail due to passage of the slide plate, the dust adhering to the cover may get into the outer rail through the gap.

Means for Solving the Problems

The present invention has been made in view of the above-mentioned problems, and it is therefore an object of the present invention to provide a linear actuator unit, in which, despite presence of a belt-like cover covering a slit-opening portion provided in an outer rail, a slide plate is allowed to freely move along the outer rail while causing the cover to retreat, and further, it is possible to prevent dust from getting into the outer rail.

That is, the linear actuator unit of the present invention includes an outer rail, an inner block, a driving means, the slide plate, a cover belt, a belt-guiding member, and a seal member. The outer rail is formed into a cylindrical shape so as to include a hollow portion, and includes the single slit-opening portion formed along an axial direction. The inner block is assembled into the hollow portion of the outer rail, and is movable along a longitudinal direction of the outer rail. The driving means is coupled to the inner block in the hollow portion of the outer rail, and causes the inner block to reciprocate along the longitudinal direction of the outer rail. The slide plate is arranged outside the slit-opening portion of the outer rail, and is coupled to the inner block through the slit-opening portion. The cover belt is tensioned between both ends in the longitudinal direction of the outer rail so as to cover the slit-opening portion. The belt-guiding member separates the cover belt from the outer rail correspondingly to movement of the slide plate so as to cause the cover belt to climb over the slide plate. The seal member seals between the belt-guiding member and the cover belt and between the belt-guiding member and the outer rail. Thus, the dust is prevented from getting into the hollow portion of the outer rail.

In the present invention structured as described above, the belt-guiding member separates the cover belt from the outer rail correspondingly to movement of the slide plate, and a gap is formed between the cover belt and the outer rail. Thus, the slide plate is allowed to move along the outer rail. Meanwhile, the seal member seals, in the periphery of the belt-guiding member, between the belt-guiding member and the cover belt and between the belt-guiding member and the outer rail. Thus, the dust is prevented from getting into the outer rail through the gap formed by the belt-guiding member. With this, it is possible to seal the hollow portion of the outer rail in an entire area in the longitudinal direction of the outer rail. Further, it is possible to satisfactorily maintain a traveling accuracy of the inner block with respect to the outer rail and a conveying accuracy of the inner block by the driving means over a long period.

BEST MODE FOR CARRYING OUT THE INVENTION

Hereinafter, a linear actuator unit of the present invention is described in detail with reference to the attached drawings.

Figure 1:
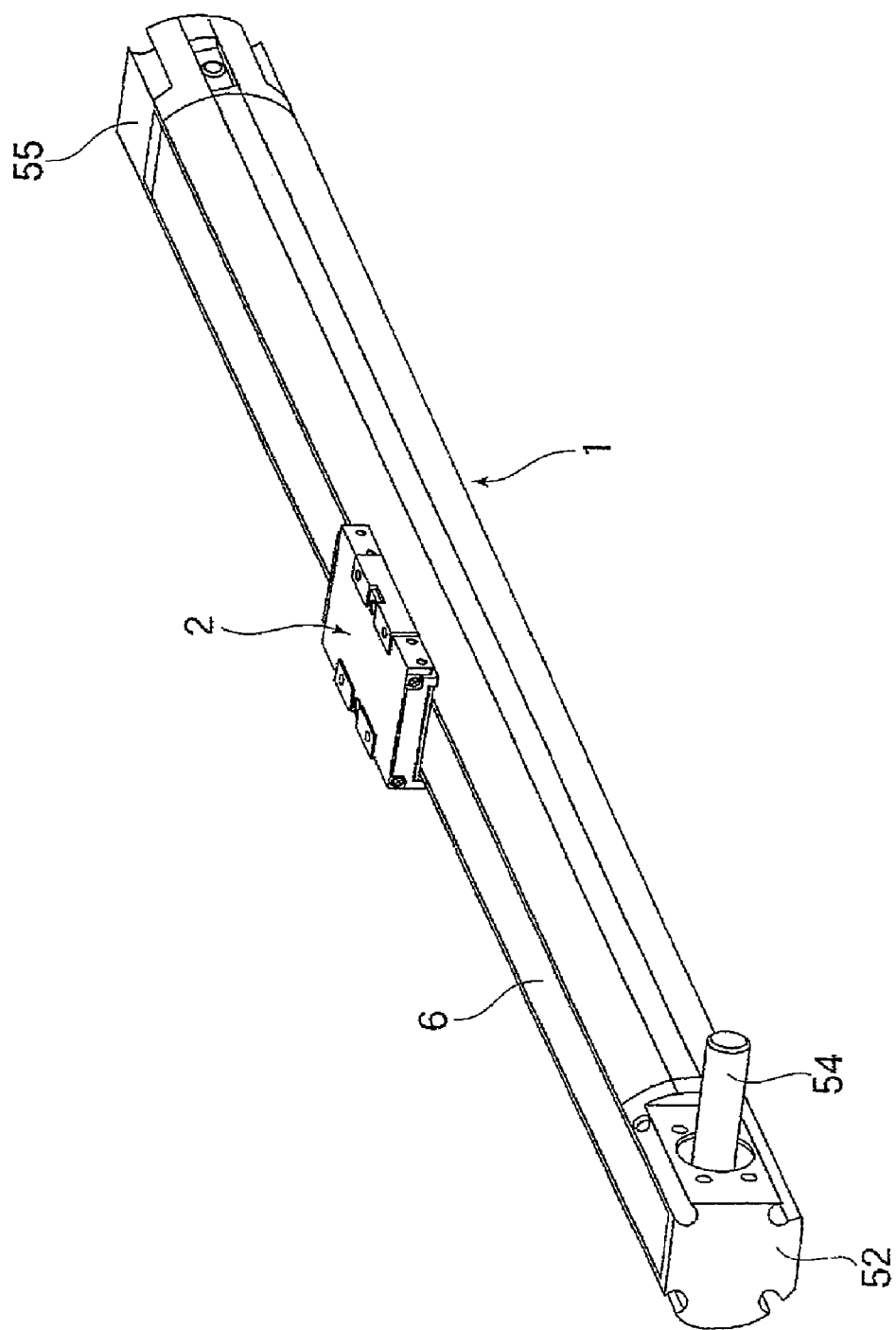
[FIG. 1] A perspective view illustrating an entire of a linear actuator unit of the present invention.

FIG. 1 is a perspective view illustrating one example of the linear actuator unit, to which the present invention is applied. The linear actuator unit includes: an outer rail 1 formed into a substantially cylindrical shape so as to include a hollow portion; and a slide plate 2 performing a liner reciprocating movement along the outer rail 1. In its structure, an object to be conveyed, which is installed on such slide plate 2, can be caused to move along the outer rail 1 so as to be positioned at an arbitrary position.

Figure 2:
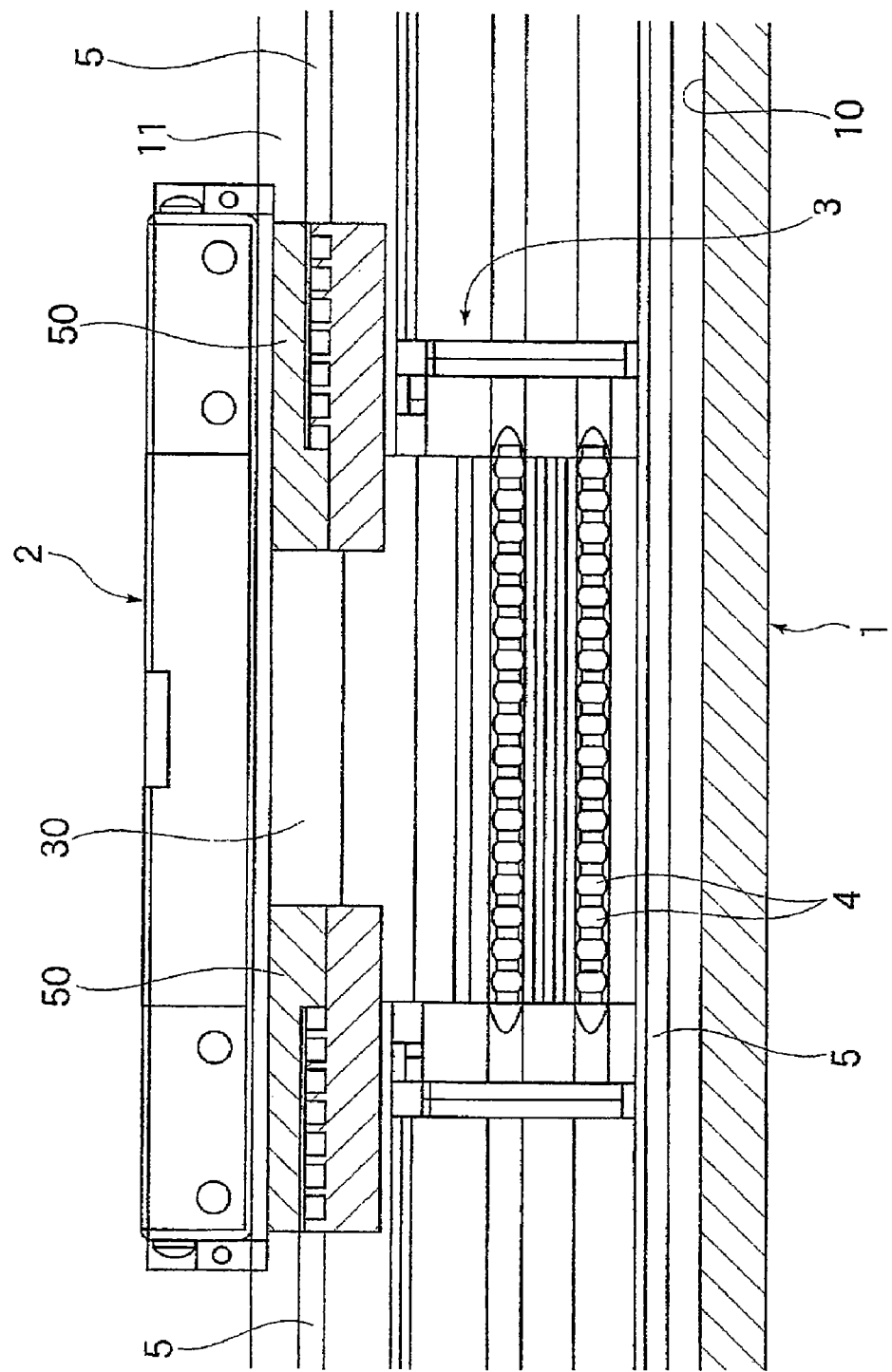
[FIG. 2] A side cross-sectional view illustrating an assembly state of an outer rail and an inner block in the linear actuator unit illustrated in FIG. 1.
Figure 3:
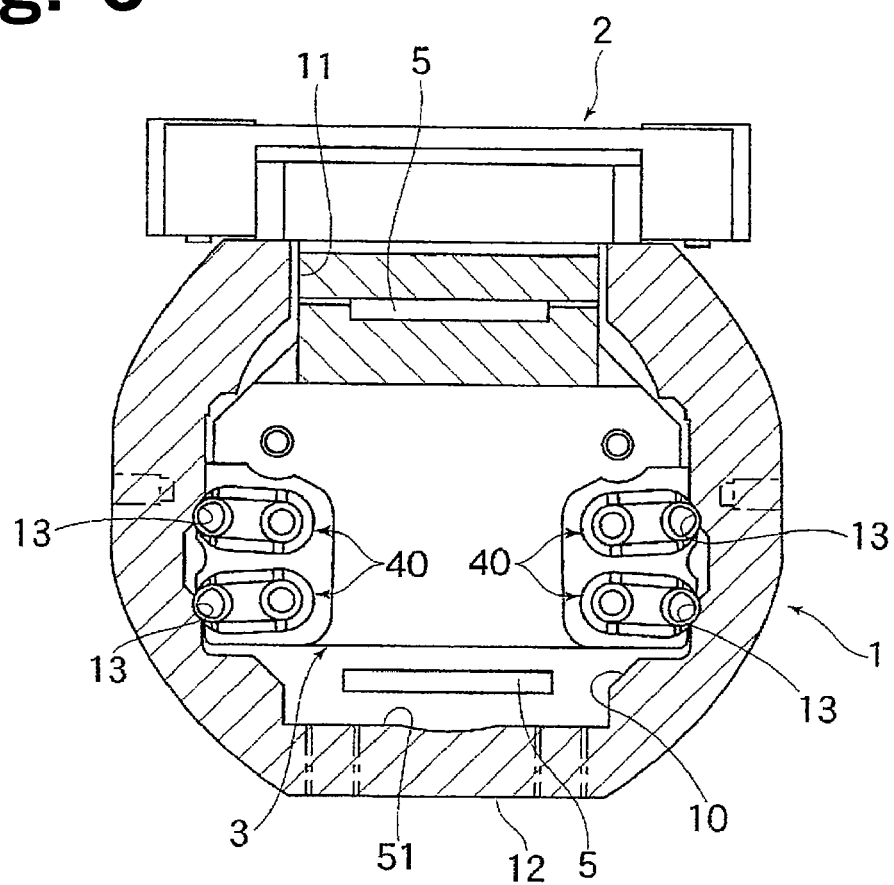
[FIG. 3] A front cross-sectional view illustrating the assembly state of the outer rail and the inner block in the linear actuator unit illustrated in FIG. 1.

FIG. 2 is a cross-sectional view illustrating an inside of the hollow portion by cutting out the outer rail 1 along a longitudinal direction thereof. FIG. 3 is a cross-sectional view of the outer rail 1 taken along a plane perpendicular to the longitudinal direction. The outer rail 1 includes the hollow portion 10, and is provided, along the longitudinal direction, with a slit-opening portion 11 continuous with the hollow portion 10. A cross-section perpendicular to the longitudinal direction of the outer rail 1 forms a substantially C-shape. Further, in an outer peripheral surface of the outer rail 1, there is formed a reference flat surface 12 for fixation of the outer rail on an opposite side to the slit-opening portion 11. Such reference flat surface 12 is provided with a tap hole for screwing a fixing bolt thereinto.

The hollow portion 10 of the outer rail 1 houses an inner block 3. The slide plate 2 is coupled to the inner block 3 through a neck portion 30 inserted into the slit-opening portion 11. In the example illustrated in FIG. 2 and FIG. 3, the inner block 3, the neck portion 30, and the slide plate 2 are integrally formed of one metal block. However, it is also possible to employ a structure in which the neck portion 30 and the slide plate 2 are fixed to the inner block 3 with a screw.

The inner block 3 is assembled into the hollow portion 10 of the outer rail 1 through a plurality of balls 4, and is allowed to freely move in the hollow portion 10 along the longitudinal direction of the outer rail 1. In an inner wall facing the hollow portion 10 of the outer rail 1, there is formed four rolling contact surfaces 13 for the balls. Meanwhile, the inner block 3 is provided with infinitely circulating paths 40 for the balls 4 correspondingly to the rolling surfaces 13 of the outer rail 1. The balls 4 circulate through the infinitely circulating paths 40 provided to the inner block 3 while applying a load between the outer rail 1 and the inner block 3. Thus, the inner block 3 is allowed to freely move in the hollow portion 10 of the outer rail 1.

In each of the infinitely circulating paths 40 provided to the inner block 3, the balls 4 are arranged in a line at predetermined intervals in a coupler belt formed of a synthetic resin. When the balls 4 rotatably move on the rolling contact surfaces 13 of the outer rail 1, the coupler belt circulates through the infinitely circulating paths 40 together with the balls 4. In such coupler belt, spacers are provided between respective balls 4, and hence the balls do not come into contact with each other in the infinitely circulating paths. As a result, oil films of the balls 4 are restrained from being broken, and hence it is possible to satisfactorily maintain movement of the inner block 3 with respect to the outer rail 1 over a long period. Further, a noise caused by the balls 4 colliding with each other is not generated, and hence it is possible to suppress generation of the noise even upon high-speed movement of the inner block 3.

In order to cause the inner block 3 to advance or retreat in the hollow portion 10 of the outer rail 1, the outer rail 1 is provided with a driving means 5. The driving means 5 is coupled to the inner block 3 in the hollow portion 10 of the outer rail 1. In the example of the linear actuator unit illustrated in FIG. 1 to FIG. 3, the driving means 5 is a timing belt, and the timing belt 5 is tensioned in the hollow portion 10 of the outer rail 1.

At the both ends in the longitudinal direction of the outer rail 1, there are provided a pair of pulleys around which the timing belt 5 is wound. The timing belt 5 wound around those pulleys is arranged so as to circulate throughout the hollow portion 10. As illustrated in FIG. 2, both ends of the timing belt 5 are fixed to the inner block 3 respectively in a state in which both ends of the timing belt 5 are sandwiched by fixing plates 50, and a closed loop is formed between the pair of pulleys as described above. Further, as illustrated in FIG. 3, in the hollow portion 10 of the outer rail 1, there is formed a housing groove 51 for the timing belt 5 at a position opposed to the slit-opening portion 11. With this, when the inner block 3 moves to one direction in the hollow portion 10, the timing belt 5 moves to the opposite direction through the housing groove 51.

Figure 4:
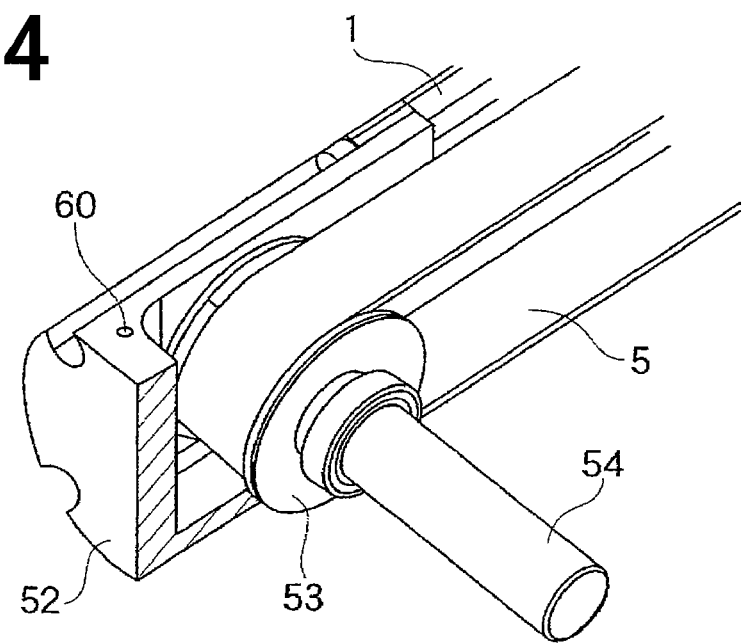
[FIG. 4] A perspective view illustrating an inside of a motor bracket fixed to one end of the outer rail.

The pulleys are retained by a motor bracket and an adjusting bracket, which are respectively mounted onto the both ends in the longitudinal direction of the outer rail 1. FIG. 4 is a perspective view illustrating the motor bracket 52 by cutting out the motor bracket 52. The motor bracket 52 is fixed to one end of the outer rail 1 in a state in which a pulley 53 is rotatably retained. The timing belt 5 is wound around such pulley 53. Further, in a rotational center of the pulley 53, there is provided a drive shaft 54, and the drive shaft 54 protrudes, as illustrated in FIG. 1, from the motor bracket 52. Thus, a motor is fixed to the motor bracket 52 through intermediation of a reduction gear if needed. The drive shaft 54 is rotated by the motor. In this way, it is possible to cause the inner block to advance or retreat in the hollow portion of the outer rail by rotating the timing belt 5 wound around the pulley 53.

Further, the driving means 5 is not limited to the timing belt. For example, it is also possible to employ a structure in which a screw shaft is provided along the longitudinal direction in the hollow portion 10 of the outer rail 1, and the inner block 3 is screwed with respect to the screw shaft. By the driving means using the screw shaft as described above, it is possible to cause the inner block 3 to advance or retreat in the hollow portion 10 correspondingly to a rotational direction and a rotational amount of such screw shaft.

Figure 5:
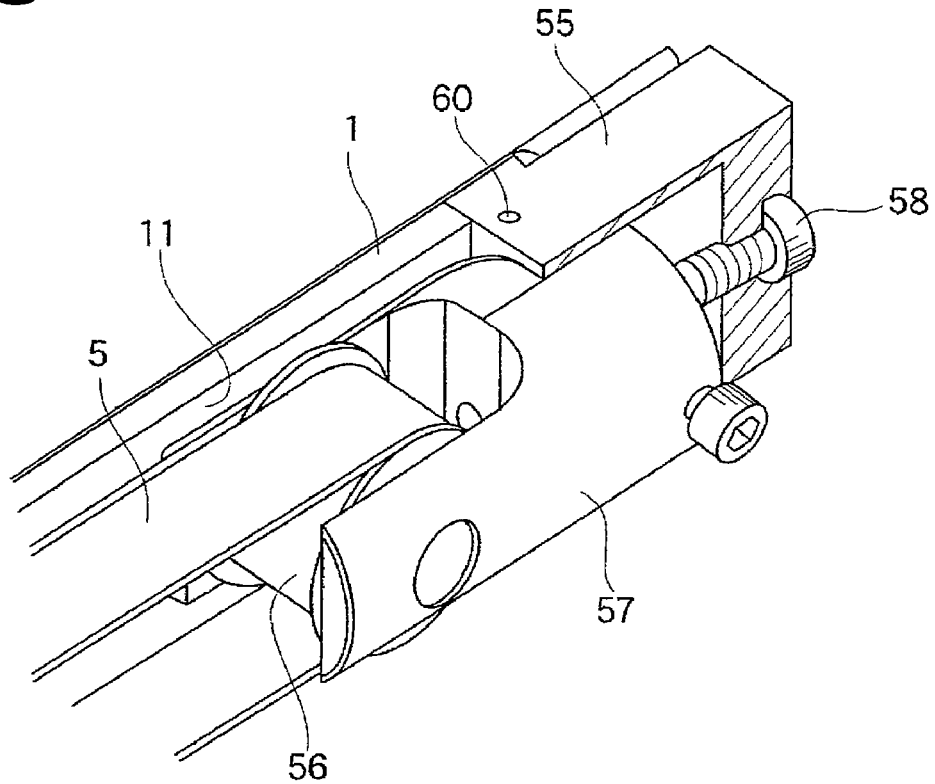
[FIG. 5] A perspective view illustrating an inside of an adjusting bracket fixed to the other end of the outer rail.

FIG. 5 is a perspective view illustrating the adjusting bracket 55 by cutting out the adjusting bracket 55. The adjusting bracket 55 is fixed to the other end of the outer rail 1, and is provided with a slide member 57 rotatably retaining a pulley 56. Such slide member 57 is movable with respect to the longitudinal direction of the outer rail 1. By fastening an adjusting screw 58 to be screwed into the adjusting bracket 55, the slide member 57 is drawn to the adjusting bracket 55 correspondingly to a fastening amount of the adjusting screw 58. Thus, by fastening the adjusting screw 58, the timing belt 5 wound around the pulley 56 is drawn, and hence it is possible to freely adjust a tension of the timing belt 5 around the pair of pulleys 53 and 56.

Meanwhile, as illustrated in FIG. 1, the slit-opening portion 11 of the outer rail 1 is covered with a cover belt 6, and hence the dust is prevented from getting into the hollow portion 10 of the outer rail 1 through the slit-opening portion 11. The cover belt 6 is formed of a thin stainless plate. Both ends in the longitudinal direction of the cover belt 6 are fixed to the motor bracket 52 and the adjusting bracket 55. As illustrated in FIG. 4 and FIG. 5, the motor bracket 52 and the adjusting bracket 55 are provided with screw holes 60 to be used upon fixing the cover belt 6. The cover belt 6 is set to have a width slightly larger than an opening width of the slit-opening portion 11 of the outer rail 1. Both edge portions along the longitudinal direction of the cover belt 6 are set to be disposed on the outer rail 1 so as to extend beyond the slit-opening portion 11. Thus, by providing an appropriate tension to the cover belt 6, the cover belt 6 is caused to come into close contact with the outer rail 1, and hence it is possible to prevent the dust from getting into the hollow portion 10 through the slit-opening portion 11.

In order to allow the slide plate 2 to move along the outer rail 1 in a state in which the cover belt 6 closes the slit-opening portion 11 of the outer rail 1, a belt-guiding member 7 for preventing intervention between the cover belt 6 and the slide plate 2 is fixed to the slide plate 2.

Figure 6:
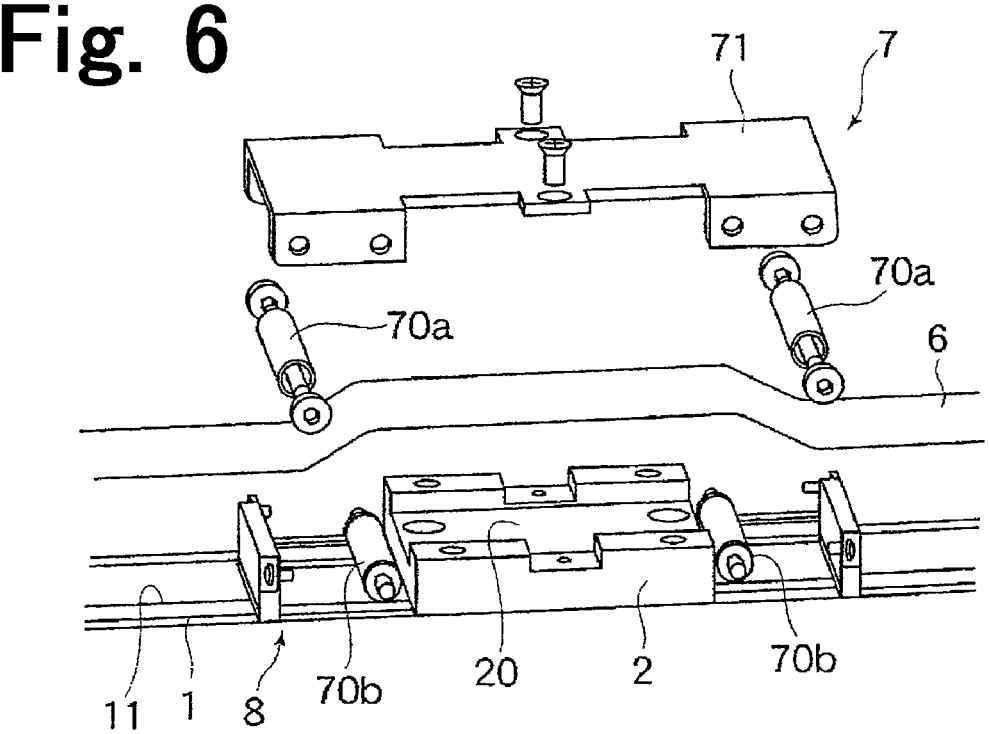
[FIG. 6] An exploded perspective view illustrating a structure of a belt-guiding member.

FIG. 6 is an exploded perspective view illustrating a structure of the belt-guiding member 7. The belt-guiding member 7 includes: belt-guiding rollers 70a and 70b arranged in two sets on a front side and a rear side in a moving direction of the slide plate 2, respectively; and a cover plate 71 bearing those four belt-guiding rollers 70a and 70b and being fixed to the slide plate 2.

Of the four belt-guiding rollers 70a and 70b, two belt-guiding rollers 70a, which are located outside, roll on the cover belt 6 so as to function to press such cover belt 6 against the outer rail 1. Meanwhile, two belt-guiding rollers 70b, which are adjacent to the slide plate 2, are located between the cover belt 6 and the outer rail 1 and function to support the cover belt 6 from a reverse side thereof. Thus, the cover belt 6 is separated from the outer rail 1 and is guided to an upper surface of the slide plate 2. In the upper surface of the slide plate 2, there is provided a guiding groove 20 for causing the cover belt 6 to pass therethrough. The cover plate 71 is fixed onto the slide plate 2 so as to cover the guiding groove 20.

When the timing belt 5 is rotationally driven by the motor and the inner block 3 is caused to advance or retreat in the hollow portion 10 of the outer rail 1, the slide plate 2, which is integrally provided with such inner block 3, advances and retreats on the outer rail 1. When the slide plate 2 moves along the outer rail 1, the belt-guiding roller 70b separates the cover belt 6 from the outer rail 1 on the front side in the moving direction of the slide plate 2. Then, such cover belt 6 is conveyed into the guiding groove 20 on the slide plate 2. Meanwhile, on the rear side in the moving direction of the slide plate 2, the cover belt 6 passing by on the belt-guiding roller 70b is pressed against the outer rail 1 by the belt-guiding roller 70a. With this, in a state in which the slit-opening portion 11 of the outer rail 1 is sealed by the cover belt 6, it is possible to cause the slide plate 2 to move along the outer rail 1 through such slit-opening portion 11, the slide plate 2 being coupled to the inner block 3.

Note that, as described above, on the front side and the rear side of the slide plate 2, the cover belt 6 is separated from the outer rail 1 by the belt-guiding roller 70b so as to be lifted up above the slide plate 2. Therefore, there is a fear in that a gap is locally formed between the cover belt 6 and the outer rail 1, and the dust adhering to the cover belt 6 gets into the outer rail 1 through the gap.

Figure 7:
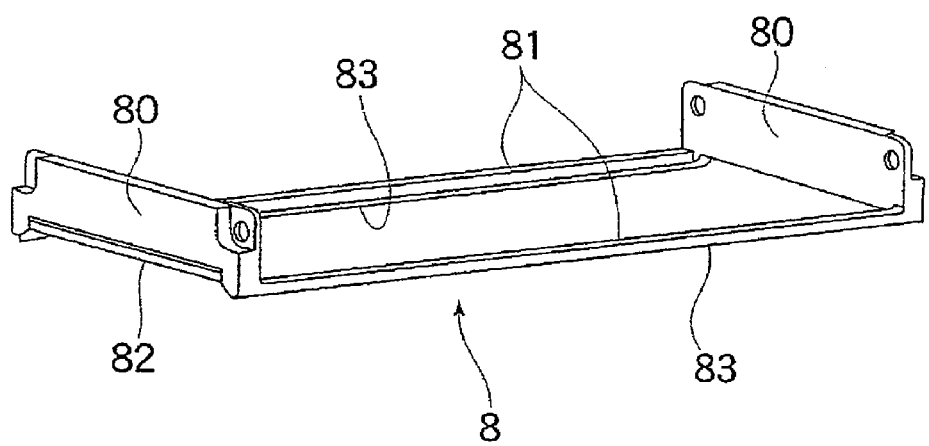
[FIG. 7] A perspective view illustrating a seal member.

For this reason, the belt-guiding member 7 is provided with a seal member 8 held in slide contact with the cover belt 6 and the outer rail 1. As illustrated in FIG. 7, the seal member 8 includes: a pair of flange portions 80 located outside the belt-guiding rollers 70a; and side frames 81 coupling those flange portions 80 with each other, in such a manner that the seal member 8 is formed into a rectangular frame-shape. At lower edges of the flange portions 80, there are provided end seal portions 82 formed of a rubber so as to have a larger width than that of the cover belt 6. Meanwhile, lower edges of the side frames 81, there are provided side seal portions 83, which are formed of a rubber and are held in contact with the outer rail 1. Those end seal portions 82 and side seal portions 83 are continuous with each other without spacing therebetween.

Figure 8:
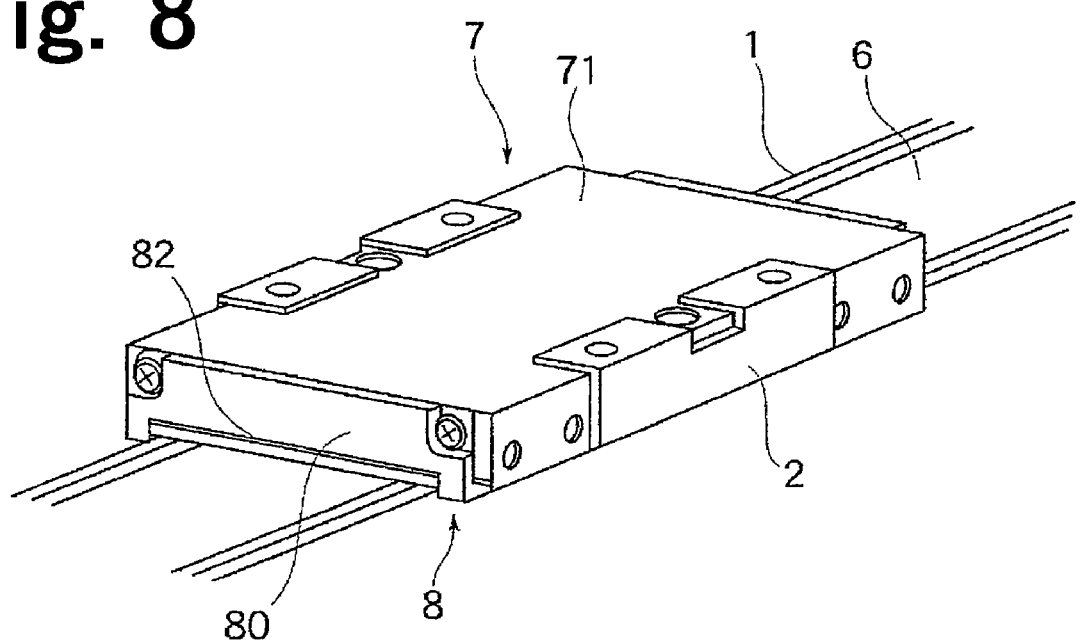
[FIG. 8] A perspective view illustrating a combination state of the seal member, the belt-guiding member, and a slide plate.

As illustrated in FIG. 6, the seal member 8 is integrated with the slide plate 2 in the following manner. Specifically, the side frames 81 are arranged so as to be held in contact with a side of a lower surface of the slide plate 2, and the seal member 8 is screwed into the cover plate 71 of the belt-guiding member 7. Further, the end seal portions 82 are held in contact with the cover belt 6, and the side seal portions 83 are held in contact with the outer rail 1 without spacing therebetween on both sides of the slit-opening portion 11. FIG. 8 is a perspective view illustrating a state in which the seal member 8 is combined with the belt-guiding member 7 and the slide plate 2.

The cover plate 71 is fixed to the slide plate 2. Further, the seal member 8 is fixed to the cover plate 71. In this way, a marginal portion of such cover plate 71 comes into close contact with the flange portions 80 and the side frames 81 of the seal member 8 and with the slide plate 2. As a result, on the front side and the rear side of the slide plate 2, there are formed a pair of housing spaces for the belt-guiding rollers 70a and 70b. Those housing spaces are opened toward the slit-opening portion 11 of the outer rail 1. Meanwhile, the end seal portions 82 and the side seal portions 83 of the seal member 8 are arranged in peripheries of those housing spaces, the end seal portions 82 are held in contact with the cover belt 6, and the side seal portions 83 are held in contact with the outer rail 1 on both sides of the slit-opening portion 11. Thus, though the housing spaces are continuous with the slit-opening portion 11 of the outer rail 1, the housing spaces are not continuous with an external ambiance of the outer rail 1.

Therefore, even when the gap between the cover belt 6 and the outer rail 1 moves together with the slide plate 2 due to movement of the slide plate 2, it is possible to prevent the dust from getting into the outer rail 1. Further, the end seal portions 82 are held in slide contact with the cover belt 6, and hence such end seal portions 82 function to remove the dust adhering to the cover belt 6. Thus, it is possible to prevent the cover belt 6 including the dust thereon from getting into the housing spaces for the belt-guiding rollers 70a and 70b. Also with this regard, it is possible to efficiently prevent the dust and the like from getting into the outer rail 1.

In addition, the end seal portions 82 are formed to have a larger width than that of the cover belt 6, and hence the end seal portions 82 extend beyond the cover belt 6 to be held in contact with the outer rail 1. In this way, the end seal portions 82 exert a function of pressing the both edge portions of such cover belt 6 against the outer rail 1. With this, a close contact characteristic between the cover belt 6 and the outer rail 1 can be also improved.

The invention claimed is:

1. A sealed linear actuator unit, comprising:
   an outer rail, having a substantially cylindrical shape which includes a hollow portion therein, and further includes a slit-opening portion disposed along an axial direction thereof;
   an inner block, disposed in the hollow portion of the outer rail, and which is movable along a longitudinal direction of the outer rail;
   a driving means, which is coupled to the inner block in the hollow portion of the outer rail, and causes the inner block to reciprocate along the longitudinal direction of the outer rail;
   a slide plate, disposed outside of the slit-opening portion of the outer rail, and which is coupled to the inner block through the slit-opening portion;
   a cover belt, which is tensioned between both ends in the longitudinal direction of the outer rail so as to cover the slit-opening portion;
   a belt-guiding member, including a separating portion which separates the cover belt from the outer rail corresponding to movement of the slide plate so as to cause the cover belt to climb over the slide plate; and
   a seal member fixed to the belt-guiding member, which seals between the belt-guiding member and the cover belt and between the belt-guiding member and the outer rail so as to prevent dust from getting into the hollow portion of the outer rail, wherein the seal member further includes,
      a pair of end seal portions, which press the cover belt against the outer rail on a front side and a rear side in a moving direction of the slide plate, and
      a pair of side seal portions, which couple the pair of end seal portions with one another, and are held in contact with the outer rail along the moving direction of the slide plate.

2. The sealed linear actuator unit according to claim 1, wherein the end seal portions and side seal portions are continuous with each other without spacing therebetween.

3. The sealed linear actuator unit according to claim 2, wherein the side plate has a guiding groove for causing the cover belt to pass therethrough, and the belt-guiding member includes a cover plate being fixed to the slide plate so as to cover the guiding groove.

4. The sealed linear actuator unit according to claim 3, wherein the seal member includes,
   a pair of flange portions disposed at the end seal portions, and
   a pair of side frames disposed at the side seal portions coupling the pair of flange portions with one another, in such a manner that the seal member is formed into a rectangular frame shape, and
   wherein the side frames of the seal member are arranged so as to be held in contact with a side of a lower surface of the slide pate, and the seal member is integrated with the slide plate so as to be fixed to the cover plate of the belt-guiding member.

* * * * *